(12) United States Patent
Koike

(10) Patent No.: US 8,967,864 B2
(45) Date of Patent: Mar. 3, 2015

(54) MAIN SPINDLE DEVICE OF MACHINE TOOL

(71) Applicant: Okuma Corporation, Niwa-Gun (JP)

(72) Inventor: Issei Koike, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 14/060,987

(22) Filed: Oct. 23, 2013

(65) Prior Publication Data

US 2014/0126845 A1    May 8, 2014

(30) Foreign Application Priority Data

Nov. 7, 2012 (JP) ................. 2012-245497

(51) Int. Cl.
| | |
|---|---|
| F16C 35/10 | (2006.01) |
| F16C 27/00 | (2006.01) |
| F16C 25/06 | (2006.01) |
| F16C 19/54 | (2006.01) |
| F16C 35/04 | (2006.01) |
| B23Q 1/70 | (2006.01) |
| F16C 35/12 | (2006.01) |

(52) U.S. Cl.
CPC ............... *F16C 27/00* (2013.01); *F16C 25/06* (2013.01); *F16C 19/547* (2013.01); *F16C 35/042* (2013.01); *B23Q 1/70* (2013.01); *F16C 2322/39* (2013.01); *F16C 35/12* (2013.01)
USPC ........................................... 384/99; 384/519

(58) Field of Classification Search
CPC ............ B23Q 1/70; F16C 25/06; F16C 35/12
USPC .............................. 384/517, 519, 556, 563, 99
See application file for complete search history.

(56) References Cited

U.S. PATENT DOCUMENTS

| | | | | |
|---|---|---|---|---|
| 3,221,606 | A | * | 12/1965 | Baldwin ...................... 409/135 |
| 3,664,718 | A | * | 5/1972 | Uhtenwoldt .................. 384/101 |
| 5,277,523 | A | * | 1/1994 | Jones ............................ 409/184 |
| 5,388,917 | A | * | 2/1995 | Hibi et al. ..................... 384/517 |
| 6,505,972 | B1 | * | 1/2003 | Harbottle et al. ............. 384/517 |

FOREIGN PATENT DOCUMENTS

| | | |
|---|---|---|
| JP | 05-138408 A1 | 6/1993 |
| JP | 06-021803 U | 3/1994 |

* cited by examiner

*Primary Examiner* — Thomas R. Hannon
(74) *Attorney, Agent, or Firm* — Burr & Brown, PLLC

(57) ABSTRACT

A main spindle device of a machine tool includes a plurality of bearings that rotatably support a main spindle of the machine tool, and that are placed inside a housing with a pressure receiving member interposed between the bearings and the housing. The pressure receiving member is capable of moving in a direction perpendicular to an axial direction of the main spindle. A pressure chamber, which a pressure medium pressing the pressure receiving member toward the bearings in the perpendicular direction is supplied to, is formed in the housing. A plurality of the pressure chambers are independently formed in the housing so as to correspond to the bearings, respectively. The main spindle device further includes a plurality of adjustment units provided independently so as to correspond the pressure chambers, respectively, and each capable of independently adjusting a pressure of the pressure medium for a corresponding one of the pressure chambers.

4 Claims, 1 Drawing Sheet

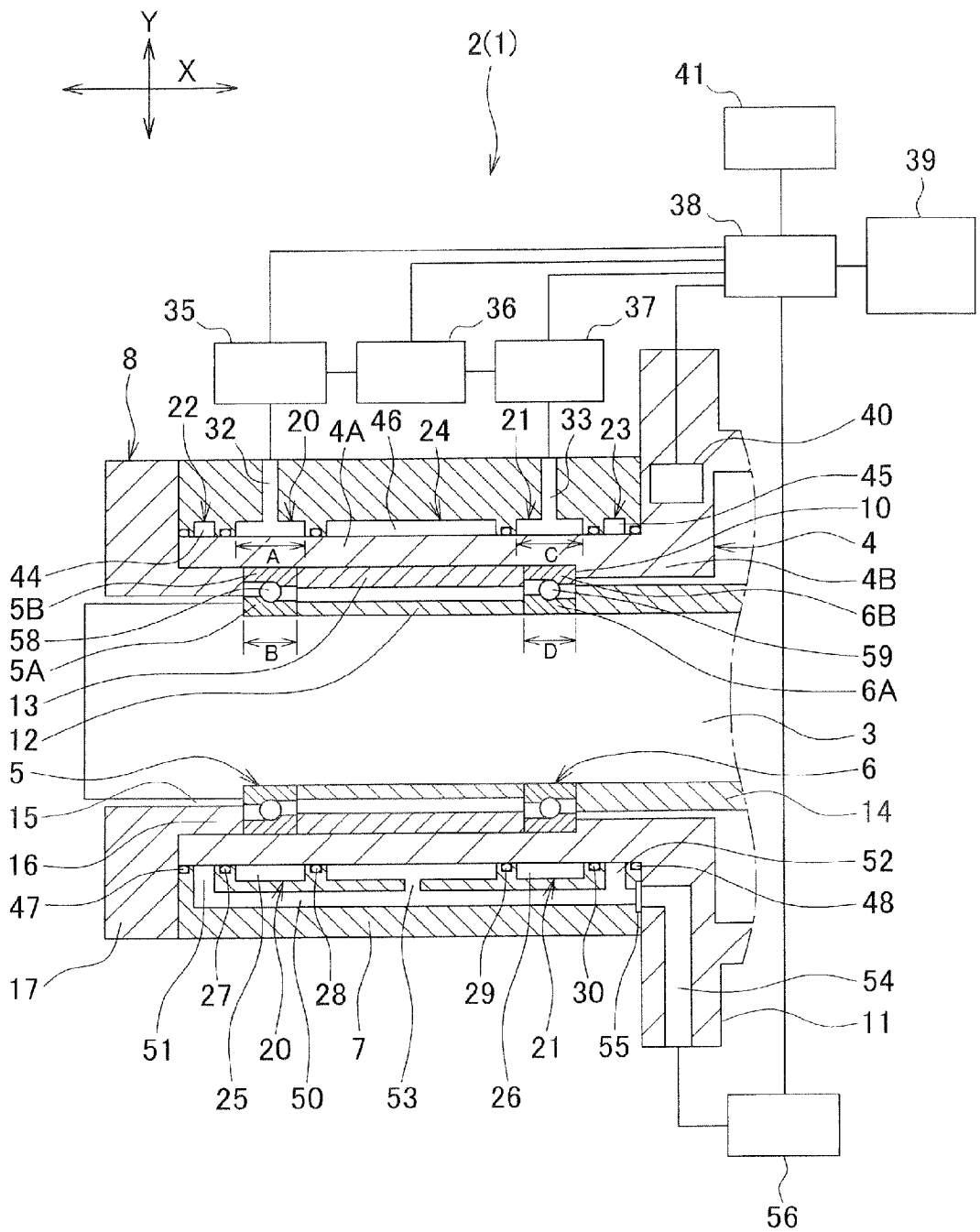
- 35, 37 PRESSURE REDUCING VALVE
- 36 HYDRAULIC UNIT
- 38 CONTROL DEVICE
- 39 MAIN-SPINDLE-ROTATIONAL-SPEED DETECTION DEVICE
- 41 STORAGE DEVICE
- 56 COOLING OIL SUPPLY DEVICE

MAIN SPINDLE DEVICE OF MACHINE TOOL

BACKGROUND OF THE INVENTION

This application claims the benefit of Japanese Patent Application Number 2012-245497 filed on Nov. 7, 2012, the entirety of which is incorporated by reference.

1. Technical Field

The present invention relates to main spindle devices of machine tools in which a plurality of bearings rotatably supporting a main spindle of the machine tool are placed inside a housing with a pressure receiving member interposed between the bearings and the housing. A pressure chamber, which a pressure medium pressing the pressure receiving member toward the bearings is supplied to, is provided in the housing.

2. Background Art

For example, Japanese Patent Application Publication No. H05-138408 (JP H05-138408 A) discloses a main spindle device of a machine tool in which clearance between a main spindle housing and each of outer races of bearings rotatably supporting a main spindle can be controlled by a simple configuration to prevent reduction in rigidity of the main spindle in a low speed rotation range. In the main spindle device of JP H05-138408 A, a pressure chamber is formed between the main spindle housing and an outer race spacer by a recessed portion of a thin ring-shaped member and the main spindle housing. The thin ring-shaped member is elastically deformed by pressure fluid supplied to the pressure chamber, and thus eliminates the clearance between the outer race of each bearing and the main spindle housing. Accordingly, reduction in rigidity of the main spindle in the low speed rotation range can be prevented.

Japanese Utility Model Application Publication No. H06-21803 (JP H06-21803 U) discloses a main spindle device of a machine tool which includes a preload adjustment device that applies preload to a plurality of bearings rotatably supporting a main spindle in a housing, in order to prevent reduction in rigidity of the main spindle. In the main spindle device of JP H06-21803 U, an annular pressing body that applies external force in the central axis direction of the main spindle is provided outward of outer races of the bearings. During low speed rotation of the main spindle, pressure oil is supplied to each pressurizing chamber formed in the annular pressing body so as to face the outer race of a corresponding one of the bearings. The annular pressing body deformed by the supply of the pressure oil presses the outer race of each bearing. This pressing force acts in the central axis direction of the main spindle and presses each bearing against the main spindle, whereby reduction in rigidity of the main spindle can be prevented.

However, in the main spindle device of JP H05-138408 A, the pressure chamber is formed between the main spindle housing and the outer race spacer, has a shape that is long in the axial direction of the main spindle, and a large capacity. This hinders uniform control of the pressure of the pressure fluid. In this case, the thin ring-shaped member subjected to the pressure of the pressure fluid cannot be uniformly elastically deformed. Accordingly, if the clearance is left in any region between the main spindle housing and the outer races of the bearings, the bearing cannot be sufficiently pressed against the main spindle in this region, and rigidity of the main spindle may not be increased.

In the main spindle device of JP H06-21803 U, the pressure oil is supplied to each pressurizing chamber through each branch oil passage that branches off from a single oil passage. The oil pressure of the pressure oil may vary between the pressurizing chamber located close to a pressure oil supply source and the pressurizing chamber located far away from the pressure oil supply source. In this case, the bearings are not uniformly pressed against the main spindle by the oil pressure. Thus, rigidity of the main spindle may not be increased in a region where the bearing is pressed by a low oil pressure.

SUMMARY OF THE INVENTION

In view of such a situation, it is an object of the present invention to provide a main spindle device of a machine tool which is capable of increasing rigidity of a main spindle by uniformly pressing each bearing against the main spindle.

According to a first aspect of the present invention, a main spindle device of a machine tool includes a plurality of bearings that rotatably support a main spindle of the machine tool, and that are placed inside a housing with a pressure receiving member interposed between the bearings and the housing. In the main spindle device, the pressure receiving member is capable of moving in a direction perpendicular to an axial direction of the main spindle, a pressure chamber, which a pressure medium pressing the pressure receiving member toward the bearings in the perpendicular direction is supplied to, is formed in the housing, and a plurality of the pressure chambers are independently formed in the housing so as to correspond to the bearings, respectively. The main spindle device of the machine tool further includes a plurality of adjustment units provided independently so as to correspond to the pressure chambers, respectively, and each capable of independently adjusting a pressure of the pressure medium for a corresponding one of the pressure chambers.

According to a second aspect of the present invention, in the first aspect, the plurality of bearings are arranged at different positions from each other in the axial direction so as to face the pressure chambers in the perpendicular direction, respectively, with the pressure receiving member interposed between the bearings and the pressure chambers. An entire length of each of the pressure chambers in the axial direction is equal to or larger than that of a corresponding one of the bearings in the axial direction.

According to a third aspect of the present invention, in the first or second aspect, a circulating path in which a bearing cooling medium circulates is formed in the housing at positions close to each of the bearings.

In the main spindle device of the machine tool according to the first aspect of the present invention, the pressure medium having its pressure adjusted by the adjustment units is supplied to each pressure chamber. Then, the pressure receiving member can be uniformly pressed toward the bearings by the pressure of the pressure medium in each pressure chamber. The pressure receiving member can thus uniformly press each bearing against the main spindle, and rigidity of the main spindle can be increased.

According to the second aspect of the present invention, the pressure of the pressure medium in each pressure chamber can be uniformly applied over the entire length of each bearing in the axial direction of the main spindle via the pressure receiving member. Each bearing can thus be uniformly pressed against the main spindle over the entire length of the bearing.

According to the third aspect of the present invention, generation of heat by, e.g., friction between the main spindle and each bearing during rotation of the main spindle can be suppressed by the hearing cooling medium circulating in the circulating path. This can suppress thermal expansion of each bearing, and can prevent seizure of each bearing.

BRIEF DESCRIPTION OF THE DRAWINGS

FIG. 1 is a configuration diagram of a main part of a machining center including a main spindle device of an embodiment of the present invention.

DETAILED DESCRIPTION OF THE INVENTION

An embodiment of the present invention will be described with reference to FIG. 1. FIG. 1 shows a main spindle device 2 of a horizontal machining center 1. The main spindle device 2 includes a main spindle 3, a pressure receiving member 4, rolling bearings 5, 6, a housing 7, and a lid member 8. The machining center 1 is an example of a machine tool of the present invention.

As shown in FIG. 1, the main spindle 3 has a hollow shape extending in the longitudinal direction of the machining center 1 (horizontal direction in FIG. 1), and a tool (not shown) is detachably attached to the front end of the main spindle 3. The pressure receiving member 4 is a hollow cylindrical shape, and is placed coaxially with the main spindle 3 so as to surround the main spindle 3. The pressure receiving member 4 has a thin cylindrical portion 4A on its front side and a thick cylindrical portion 4B on its rear side which is continuous with the thin cylindrical portion 4A. A stepped portion 10 is provided at the base end of the thin cylindrical portion 4A. The thick cylindrical portion 4B is provided with an annular protruding portion 11 integral with the thick cylindrical portion 4B and protruding outward of the thick cylindrical portion 4B. The rolling bearings 5, 6 are arranged at an interval in the axial direction X of the main spindle 3 so as to be interposed between the outer peripheral surface of the main spindle 3 and the inner peripheral surface of the pressure receiving member 4 (thin cylindrical portion 4A) at different positions from each other. In the present embodiment, a small amount of clearance (12 μm to 15 μm) is provided between an outer race 5B, 6B of each rolling bearing 5, 6 and the pressure receiving member 4 in the state where no pressure oil is supplied to pressure chambers 20, 21 described below. As described below, when pressure oil is supplied to the pressure chambers 20, 21, the pressure receiving member 4 moves toward the rolling bearings 5, 6 in the direction Y perpendicular to the axial direction X in response to the oil pressure of the pressure oil. An inner race spacer 12 is mounted between an inner race 5A of the rolling bearing 5 and an inner race 6A of the rolling bearing 6 in the axial direction X, and an outer race spacer 13 is mounted between the outer race 5B of the rolling bearing 5 and the outer race 6B of the rolling bearing 6 in the axial direction X. A collar 14 in FIG. 1 is mounted on the outer peripheral surface of the main spindle 3 and contacts the inner race 6A. The pressure oil is an example of the pressure medium in the present invention.

As shown in FIG. 1, the housing 7 is made of a metal and has a hollow cylindrical shape having an opening 15 at its front end. The housing 7 is mounted on the outer peripheral surface of the pressure receiving member 4 coaxially with the main spindle 3. As shown in FIG. 1, the rolling bearings 5, 6 rotatably supporting the main spindle 3 are thus arranged in the hollow cylindrical housing 7. Moreover, the lid member 8 includes a cylinder portion 16 and an annular flange portion 17 provided along the front end of the cylinder portion 16. The lid member 8 is attached to the front end of the housing 7 and the front end of the pressure receiving member 4. As shown in FIG. 1, in the state where the lid member 8 is attached to the front end of the housing 7 and the front end of the pressure receiving member 4, the cylinder portion 16 is fitted in the opening 15 with the main spindle 3 being inserted through the cylinder portion 16. In this state, the cylinder portion 16 presses the inner race spacer 12 and the outer race spacer 13 against the rolling bearing 6 via the rolling bearing 5. The rolling bearing 6 is thus pressed against the stepped portion 10. The flange portion 17 contacts the front surface of the housing 7 and presses the housing 7 toward the rear of the housing 7. The rear end face of the housing 7 is thus brought in to abutment with the protruding portion 11.

As shown in FIG. 1, the pressure chambers 20, 21 and circulating paths 22, 23, 24 are formed in the housing 7. The pressure chamber 20 is formed by a space surrounded by the pressure receiving member 4 and an annular groove 25 formed in the inner peripheral surface of the housing 7 along the entire circumference on the front side in the axial direction X (left side in FIG. 1). The pressure chamber 21 is formed by a space surrounded by the pressure receiving member 4 and an annular groove 26 formed in the inner peripheral surface of the housing 7 along the entire circumference on the rear side in the axial direction X (right side in FIG. 1). The interval between the central portion of the annular groove 25 and the central portion of the annular groove 26 in the axial direction X is the same as that between the central portion of the rolling bearing 5 and the central portion of the rolling bearing 6 in the axial direction X. Thus, as shown in FIG. 1, the pressure chamber 20 is placed to face the rolling bearing 5 with the thin cylindrical portion 4A of the pressure receiving member 4 interposed between the pressure chamber 20 and the rolling bearing 5 in the perpendicular direction Y. The pressure chamber 21 is placed to face the rolling bearing 6 with the thin cylindrical portion 4A interposed between the pressure chamber 21 and the rolling bearing 6 in the perpendicular direction Y. Moreover, in the present embodiment, the entire length A of the pressure chamber 20 in the axial direction X is equal to or larger than the entire length B of the rolling bearing 5 in the axial direction X. The entire length C of the pressure chamber 21 in the axial direction X is equal to or larger than the entire length D of the rolling bearing 6 in the axial direction X. O-rings 27, 28 that seal the pressure oil in the pressure chamber 20 and O-rings 29, 30 that seal the pressure oil in the pressure chamber 21 are provided between the pressure receiving member 4 and the housing 7.

Moreover, as shown in FIG. 1, a pressure-oil supply path 32 that allows the pressure chamber 20 to communicate with the outside of the housing 7 is formed in the housing 7. A pressure-oil supply path 33 that allows the pressure chamber 21 to communicate with the outside of the housing 7 is formed in the housing 7 independently of the pressure-oil supply path 32. The pressure-oil supply path 32 is connected through a pressure reducing valve 35 to a hydraulic unit 36 capable of supplying pressure oil. The hydraulic unit 36 is also connected to the pressure-oil supply path 33 through a pressure reducing valve 37.

A control device 38 is connected to the hydraulic unit 36 and the pressure reducing valves 35, 37. A main-spindle-rotational-speed detection device 39, a temperature detection sensor 40, and a storage device 41 are connected to the control device 38. The main-spindle-rotational-speed detection device 39 detects the rotational speed of the main spindle 3 based on a rotational speed command value that is set by the operator of the machining center 1 operating a control panel (not shown). The temperature detection sensor 40 is accommodated in the pressure receiving member 4 and detects the temperature of the pressure receiving member 4. This temperature detection sensor 40 indirectly detects the temperature of both rolling bearings 5, 6 from the detected temperature of the pressure receiving member 4. The storage device 41 prestores, for each pressure chamber 20, 21, data of the oil pressure of the pressure oil that is supplied to each pressure chamber 20, 21 corresponding to the rotational speed of the main spindle 3 detected by the main-spindle-rotational-speed detection device 39 and the temperature of the pressure receiving member 4 detected by the temperature detection sensor 40. The control device 38 selects the data of the oil pressure from the storage device 41 based on the rotational speed of the main spindle 3 and the temperature of the pressure receiving member 4. The control device 38 sends an operation command signal according to the selected data to the hydraulic unit 36, and sends an open/close control signal according to the selected data to each pressure reducing valve 35, 37. The oil pressure in the pressure chamber 20 and the oil pressure in the pressure chamber 21 are thus adjusted to a predetermined oil pressure selected from the storage device 41, as described below.

As shown in FIG. 1, the circulating paths 22 to 24 are formed in the housing 7 and circulate cooling oil for cooling each rolling bearing 5, 6. The circulating path 22 is formed in the housing 7 so as to adjoin the pressure chamber 20 on the front side of the pressure chamber 20 in the axial direction X. This circulating path 22 is formed by a space surrounded by the pressure receiving member 4 and an annular groove 44 formed in the inner peripheral surface of the housing 7 along the entire circumference on the front side of the annular groove 25 (see FIG. 1) in the axial direction X. An O-ring 47 is provided between the pressure receiving member 4 and the housing 7. The cooling oil is sealed in the circulating path 22 with this O-ring 47 and the O ring 27 (see FIG. 1). As shown in FIG. 1, the circulating path 22 adjoins the pressure chamber 20 facing the rolling bearing 5 with the pressure receiving member 4 interposed between the pressure chamber 20 and the rolling bearing 5. Therefore, the circulating path 22 can be formed in the housing 7 at a position close to the rolling bearing 5.

The circulating path 23 is formed in the housing 7 so as to adjoin the pressure chamber 21 on the rear side of the pressure chamber 21 in the axial direction X. This circulating path 23 is formed by a space surrounded by the pressure receiving member 4 and an annular groove 45 formed in the inner peripheral surface of the housing 7 along the entire circumference on the rear side of the annular groove 26 (see FIG. 1) in the axial direction X. An O-ring 48 is provided between the pressure receiving member 4 and the housing 7. The cooling oil is sealed in the circulating path 23 with this O-ring 48 and the O ring 30 (see FIG. 1). As shown in FIG. 1, the circulating path 23 adjoins the pressure chamber 21 facing the rolling bearing 6 with the pressure receiving member 4 interposed between the pressure chamber 21 and the rolling bearing 6. Therefore, the circulating path 23 can be formed in the housing 7 at a position close to the rolling bearing 6.

The circulating path 24 is formed in the housing 7 so as to be interposed between the pressure chamber 20 and the pressure chamber 21 in the axial direction X. This circulating path 24 is formed by a space surrounded by the pressure receiving member 4 and an annular groove 46 formed in the inner peripheral surface of the housing 7 along the entire circumference between the annular groove 25 and the annular groove 26 in the axial direction X. As shown in FIG. 1, the lateral dimension of the annular groove 46 in the axial direction X is made slightly smaller than the interval between the rear wall of the pressure chamber 20 and the front wall of the pressure chamber 21 in the axial direction X. The front wall of the annular groove 46 in the axial direction X adjoins the O-ring 28 that seals the pressure oil in the pressure chamber 20. The rear wall of the annular groove 46 in the axial direction X adjoins the O-ring 29 that seals the pressure oil in the pressure chamber 21. The cooling oil can thus be sealed in the circulating path 24 (annular groove 46) with the O-ring 28 and the O-ring 29. As shown in FIG. 1, since the front wall of the circulating path 24 in the axial direction X adjoins the rear wall of the pressure chamber 20 facing the rolling bearing 5 with the pressure receiving member 4 interposed between the pressure chamber 20 and the rolling bearing 5, the circulating path 24 can be formed in the housing 7 at a position close to the rolling bearing 5. Moreover, since the rear wall of the circulating path 24 in the axial direction X adjoins the front wall of the pressure chamber 21 facing the rolling bearing 6 with the pressure receiving member 4 interposed between the pressure chamber 21 and the rolling bearing 6, the circulating path 24 can be formed in the housing 7 at a position close to the rolling bearing 6.

As shown in FIG. 1, a main cooling oil passage 50 is formed in the housing 7. The main cooling oil passage 50 extends along the axial direction X and has its rear end opening to the rear end face of the housing 7. Moreover, a first branch cooling oil passage 51, a second branch cooling oil passage 52, and a third branch cooling oil passage 53 are formed in the housing 7. The first branch cooling oil passage 51 branches off from the main cooling oil passage 50 to communicate with the circulating path 22. The second branch cooling oil passage 52 branches off from the main cooling oil passage 50 to communicate with the circulating path 23. The third branch cooling oil passage 53 branches off from the main cooling oil passage 50 to communicate with the circulating path 24.

A cooling oil supply path 54 is formed in the protruding portion 11 of the pressure receiving member 4. The front end of the cooling oil supply path 54 is connected to the rear end of the main cooling oil passage 50 in the abutting portion of the rear end face of the housing 7 on the protruding portion 11. An O-ring 55 is provided between the rear end face of the housing 7 and the protruding portion 11 so as to be disposed on the outer periphery of the main cooling oil passage 50 and the outer periphery of the cooling oil supply path 54. A cooling oil supply device 56 capable of supplying the cooling oil for cooling each rolling bearing 5, 6 is connected to the cooling oil supply path 54, and the control device 38 is connected to the cooling oil supply device 56. This cooling oil supply device 56 supplies the cooling oil to the main cooling oil passage 50 through the cooling oil supply path 54 in response to an operation command signal from the control device 38. The cooling oil is supplied from the main cooling oil passage 50 to each circulating path 22 to 24 through each branch cooling oil passage 51 to 53, and is then returned to the cooling oil supply device 56 through a cooling oil recovery path (not shown). Thereafter, the cooling oil supply device 56 repeats the operation of cooling the cooling oil and sequentially circulating the cooling oil in the cooling oil supply path 54, the main cooling oil passage 50, each branch cooling oil passage 51 to 53, each circulating path 22 to 24, and the cooling oil recovery path. The cooling oil is an example of the bearing cooling medium in the present invention.

Next, operation of the main spindle device 2 will be described. A tool is mounted on the front end of the main spindle 3 shown in FIG. 1, and for example, a workpiece (not shown) is cut with the tool rotating together with the main spindle 3. Any chatter vibrations caused during the cutting work can be suppressed by increasing the rigidity of the main spindle 3 as follows. If chatter vibrations are caused, the operator of the machining center 1 operates the control panel to send an oil pressure application command signal to the control device 38. In response to the oil pressure application command signal, the control device 38 selects data of a predetermined oil pressure stored in the storage device 41, based on the rotational speed of the main spindle 3 detected by the main-spindle-rotational-speed detection device 39 and the temperature of the pressure receiving member 4 detected by the temperature detection sensor 40. Then, the control device 38 sends an operation command signal according to the data of the oil pressure to the hydraulic unit 36, and sends an open/close control signal according to the oil pressure data to each pressure reducing valve 35, 37. The pressure reducing valves 35, 37 are thus independently controlled to be opened or closed to control the oil pressure in the pressure oil supply passages 32, 33, respectively. The oil pressure in the pressure chamber 20 communicating with the pressure oil supply path 32 and the oil pressure in the pressure chamber 21 communicating with the pressure oil supply path 33 are thus adjusted to the predetermined oil pressure selected from the storage device 41.

If the oil pressure in each pressure chamber 20, 21 increases to the predetermined oil pressure, the oil pressure in these pressure chambers 20, 21 uniformly presses the thin cylindrical portion 4A of the pressure receiving member 4, and the pressure receiving member 4 uniformly moves toward the outer races 5B, 6B in the perpendicular direction Y. The clearance between each outer race 5B, 6B and the pressure receiving member 4 is thus eliminated, and the oil pressure is uniformly applied to each outer race 5B, 6B through the pressure receiving member 4. Each inner race 5A, 6A is thus uniformly pressed against the outer peripheral surface of the main spindle 3. This can increase the rigidity or the main spindle 3. In particular, in the present embodiment, since the entire length A of the pressure chamber 20 is made equal to or larger than the entire length B of the rolling bearing 5 in the axial direction X, the oil pressure in the pressure chamber 20 can be uniformly applied to the outer race 5B in the axial direction X through the thin cylindrical portion 4A. Moreover, since the entire length C of the pressure chamber 21 is made equal to or larger than the entire length D of the rolling bearing 6 in the axial direction X, the oil pressure in the pressure chamber 21 can be uniformly applied to the outer race 6B in the axial direction X through the thin cylindrical portion 4A. The pressure reducing valves 35, 37, the hydraulic unit 36, the control device 38, the main-spindle-rotational-speed detection device 39, the temperature detection sensor 40, and the storage device 41 are an example of the adjustment units in the present invention.

In addition, the present embodiment is advantageous in that the pressure receiving member 4 can be easily moved toward both outer races 5B, 6B because the oil pressure is applied to the thin cylindrical portion 4A that is lighter than the thick cylindrical portion 4B. Moreover, since the pressure receiving member 4 is made of a metal, it has higher mechanical strength than, e.g., a pressure receiving member molded by using an elastic material. The pressure receiving member 4 is thus advantageous in that it has high fatigue strength.

When cutting the workpiece, the cooling oil supply device 56 repeats the operation of cooling the cooling oil and sequentially circulating the cooling oil in the cooling oil supply path 54, the main cooling oil passage 50, each branch cooling oil passage 51 to 53, each circulating path 22 to 24, and the cooling oil recovery path, in response to the operation command signal from the control device 38. In the cutting work, heat generated by, e.g., friction between the main spindle 3 and each rolling bearing 5, 6 is conducted to the pressure receiving member 4 that contacts each rolling bearing 5, 6.

The cooling oil circulating in each circulating path 22 to 24 removes the heat, whereby generation of the heat can be suppressed. Thermal expansion of the rolling bearings 5, 6 can thus be suppressed. This can prevent, e.g., seizure between a rolling element 58 and the inner race 5A and between a rolling element 59 and the inner race 6A. In particular, in the present embodiment, the circulating paths 22 to 24 are formed in the housing 7 so as to contact the thin cylindrical portion 4A. Accordingly, heat that is conducted through the thin cylindrical portion 4A faster than through the thick cylindrical portion 4B can be effectively removed by the cooling oil circulating in the circulating paths 22 to 24. Generation of the heat can thus be effectively suppressed.

(Effects of the Embodiment)

In the main spindle device 2 of the present embodiment, the oil pressure adjusted to a predetermined oil pressure is supplied to each pressure chamber 20, 21, whereby the pressure receiving member 4 can be uniformly pressed toward both rolling bearings 5, 6 by the oil pressure in each pressure chamber 20, 21. The pressure receiving member 4 can thus uniformly press each rolling bearing 5, 6 against the main spindle 3, and the rigidity of the main spindle 3 can be increased.

Since the entire length A of the pressure chamber 20 is made equal to or larger than the entire length B of the rolling bearing 5 in the axial direction X, the oil pressure in the pressure chamber 20 can be uniformly applied to the outer race 5B in the axial direction X through the thin cylindrical portion 4A. Moreover, since the entire length C of the pressure chamber 21 is made equal to or larger than the entire length D of the rolling bearing 6 in the axial direction X, the oil pressure in the pressure chamber 21 can be uniformly applied to the outer race 6B in the axial direction X through the thin cylindrical portion 4A. This allows the rolling bearing 5 and the rolling bearing 6 to be uniformly pressed against the main spindle 3 over the entire length B of the rolling bearing 5 and the entire length D of the rolling bearing 6.

Moreover, heat that is generated by friction between the main spindle 3 and each rolling bearing 5, 6 during, e.g., rotation of the main spindle 3 can be suppressed by the cooling oil circulating in each circulating path 22 to 24. This can suppress thermal expansion of the rolling bearings 5, 6, and thus can prevent seizure between the rolling element 58 and the inner race 5A and between the rolling element 59 and the inner race 6A.

The present invention is not limited to the above embodiment, and may be carried out by partially modifying the configuration as appropriate without departing from the spirit and scope of the invention. In the above embodiment, the pressure receiving member 4 is moved toward both outer races 5B, 6B by the oil pressure. Alternatively, however, the pressure receiving member 4 may be moved toward both outer races 5B, 6B by, e.g., the pressure of compressed air that is supplied by an air supply device. In the above embodiment, generation of the heat during rotation of the main spindle 3 is suppressed by the cooling oil. Alternatively, however, generation of the heat may be suppressed by, e.g., cooling water or coolant.

In the above embodiment, the temperature of each rolling bearing 5, 6 is indirectly detected by the temperature detection sensor 40 provided in the pressure receiving member 4. Alternatively, the temperature of each rolling bearing 5, 6 may be directly detected by a temperature detection sensor attached to each rolling bearing 5, 6. Moreover, in the above embodiment, the oil pressure in each pressure chamber 20, 21 is adjusted by automatically controlling the hydraulic unit 36 and the pressure reducing valves 35, 37 based on the operation command signal and the open/close control signal which are sent from the control device 38. Alternatively, for example, a display device that displays data of a predetermined oil pressure selected from the storage device 41 by the control device 38 may be provided, and the operator may manually operate a hydraulic pump or the pressure reducing valves to adjust the oil pressure in each pressure chamber 20, 21 to the predetermined oil pressure. Moreover, the clearance dimension between the outer race of each rolling bearing 5, 6 and the pressure receiving member 4 is not limited to 12 μm to 15 μm, and may be set to an appropriate value.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A main spindle device of a machine tool, comprising:
    a plurality of bearings that rotatably support a main spindle of the machine tool, and that are placed inside a housing with a pressure receiving member interposed between the bearings and the housing, wherein
    the pressure receiving member has a first cylindrical portion and a second cylindrical portion in an axial direction, the first cylindrical portion being connected with the second cylindrical portion, the second cylindrical portion being thicker than the first cylindrical portion,
    the pressure receiving member is capable of moving in a direction perpendicular to an axial direction of the main spindle,
    a pressure chamber, which a pressure medium pressing the pressure receiving member toward the bearings in the perpendicular direction is supplied to, is formed in the housing, so that the pressure receiving member is arranged to contact to the plurality of bearings, and
    a plurality of the pressure chambers are independently formed in the housing so as to correspond to the bearings, respectively, the main spindle device of the machine tool further comprising:
    a plurality of adjustment units provided independently so as to correspond the pressure chambers, respectively, and each capable of independently adjusting a pressure of the pressure medium for a corresponding one of the pressure chambers.

2. The main spindle device of the machine tool according to claim 1, wherein
    the plurality of bearings are arranged at different positions from each other in the axial direction so as to face the pressure chambers in the perpendicular direction, respectively, with the pressure receiving member interposed between the bearings and the pressure chambers, and
    an entire length of each of the pressure chambers in the axial direction is larger than that of a corresponding one of the bearings in the axial direction.

3. The main spindle device of the machine tool according to claim 2, wherein
    a circulating path in which a bearing cooling medium circulates in contact with the pressure receiving member is formed at positions close to each of the bearings.

4. The main spindle device of the machine tool according to claim 1, wherein
    a circulating path in which a bearing cooling medium circulates in contact with the pressure receiving member is formed at positions close to each of the bearings.

* * * * *